(12) United States Patent
Wang

(10) Patent No.: US 11,733,493 B2
(45) Date of Patent: Aug. 22, 2023

(54) CAMERA OPTICAL LENS

(71) Applicant: AAC Optics (Changzhou) Co., Ltd., Changzhou (CN)

(72) Inventor: Yanan Wang, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 435 days.

(21) Appl. No.: 17/134,499

(22) Filed: Dec. 28, 2020

(65) Prior Publication Data
US 2022/0066164 A1 Mar. 3, 2022

(30) Foreign Application Priority Data
Aug. 26, 2020 (CN) .......................... 202010867261.9

(51) Int. Cl.
| | |
|---|---|
| G02B 9/60 | (2006.01) |
| G02B 13/00 | (2006.01) |
| G02B 13/06 | (2006.01) |
| G02B 27/00 | (2006.01) |

(52) U.S. Cl.
CPC .......... *G02B 13/0045* (2013.01); *G02B 9/60* (2013.01); *G02B 13/06* (2013.01); *G02B 27/0025* (2013.01)

(58) Field of Classification Search
CPC ... G02B 9/60; G02B 9/61; G02B 9/62; G02B 9/63; G02B 9/64; G02B 13/0045
See application file for complete search history.

(56) References Cited

FOREIGN PATENT DOCUMENTS

| | | | | |
|---|---|---|---|---|
| CN | 101782676 A | * | 7/2010 | ............. G02B 13/00 |
| CN | 206057667 U | * | 3/2017 | ............. G02B 13/00 |
| CN | 106802470 A | * | 6/2017 | ......... G02B 13/0045 |
| CN | 110850563 A | * | 2/2020 | ......... G02B 13/0045 |
| CN | 111025547 A | * | 4/2020 | ......... G02B 13/0015 |
| JP | 2017187566 A | * | 10/2017 | ......... G02B 13/0045 |
| KR | 20160105045 A | * | 9/2016 | ......... G02B 13/0045 |

* cited by examiner

*Primary Examiner* — Violeta A Prieto
*Assistant Examiner* — Mackenzi Waddell
(74) *Attorney, Agent, or Firm* — W&G Law Group

(57) ABSTRACT

The present invention provides a camera optical lens, including, from an object side to an image side, a first lens having a positive refractive power, a second lens having a negative refractive power, a third lens having a positive refractive power, a fourth lens having a positive refractive power, and a fifth lens having a negative refractive power. The camera optical lens satisfies: −2.00≤f2/f≤−1.25; −1.50≤f4/f5≤−0.80; 1.50≤d6/d8≤3.00; −1.50≤(R1+R2)/(R1−R2)≤−1.00; and 6.00≤R9/R10≤15.00. The camera optical lens has excellent optical performance while meeting the design requirements of a large aperture, a wide angle, and ultra-thinness.

10 Claims, 9 Drawing Sheets

CAMERA OPTICAL LENS

TECHNICAL FIELD

The present invention relates to the field of optical lenses, and more particularly, to a camera optical lens suitable for portable terminal devices such as smart phones and digital cameras, as well as camera devices such as monitors and PC lenses.

BACKGROUND

In recent years, with the popularity of smart phones, the demand for a miniaturized camera lens has increased. The photosensitive devices of a conventional camera lens are nothing more than charge coupled devices (CCD) or complementary metal-oxide semiconductor devices (CMOS Sensor). With the advancement of semiconductor manufacturing technology, the pixel size of the photosensitive device has become smaller and smaller, and nowadays electronic products are developing with good functions and thin and small appearance. Therefore, the miniaturized camera lens with good imaging quality has become the mainstream in the current market.

In order to obtain a better imaging quality, the camera lens traditionally mounted onto mobile phone cameras mostly adopts a structure including three lenses or four lenses. However, with the development of technology and increased diversified requirements from the users, in the situation where a pixel area of a photosensitive device gradually decreases and the requirement in the imaging quality gradually increases, camera lenses having five lenses have gradually appeared in lens design. Although the conventional camera lens including five lenses has a good optical performance, there is still some irrationality in terms of refractive power, a distance between lenses and a shape of the lenses. As a result, the lens structure cannot meet the design requirements of a large aperture, a wide angle and ultra-thinness while having good optical performance.

Therefore, it is necessary to provide a camera optical lens that has good optical performance while meeting the design requirements of a large aperture, a wide angle and ultra-thinness.

SUMMARY

A purpose of the present invention is to provide a camera optical lens, aiming to solve the problems of insufficient large aperture, wide angle, and ultra-thinness of the conventional camera optical lens.

The technical schemes of the present invention are as follows.

A camera optical lens includes, from an object side to an image side, a first lens having a positive refractive power, a second lens having a negative refractive power, a third lens having a positive refractive power, a fourth lens having a positive refractive power, and a fifth lens having a negative refractive power. The camera optical lens satisfies: $-2.00 \leq f2/f \leq -1.25$; $-2.00 \leq f2/f \leq -1.25$; $-1.50 \leq f4/f5 \leq -0.80$; $1.50 \leq d6/d8 \leq 3.00$; $-1.50 \leq (R1+R2)/(R1-R2) \leq -1.00$; and $6.00 \leq R9/R10 \leq 15.00$, where f denotes a focal length of the camera optical lens, f2 denotes a focal length of the second lens, f4 denotes a focal length of the fourth lens, f5 denotes a focal length of the fifth lens, d6 denotes an on-axis distance from an image side surface of the third lens to an object side surface of the fourth lens, d8 denotes an on-axis distance from an image side surface of the fourth lens to an object side surface of the fifth lens, R1 denotes a central curvature radius of an object side surface of the first lens, R2 denotes a central curvature radius of an image side surface of the first lens, R9 denotes a central curvature radius of the object side surface of the fifth lens, and R10 denotes a central curvature radius of an image side surface of the fifth lens.

In an improved embodiment, the camera optical lens further satisfies following conditions: $-10.00 \leq (R5+R6)/(R5-R6) \leq -2.00$, where R5 denotes a central curvature radius of an object side surface of the third lens, and R6 denotes a central curvature radius of the image side surface of the third lens.

In an improved embodiment, the camera optical lens further satisfies following conditions: $0.38 \leq f1/f \leq 1.62$; and $0.05 \leq d1/TTL \leq 0.18$, where f1 denotes a focal length of the first lens, d1 denotes an on-axis thickness of the first lens, and TTL denotes a total optical length from the object side surface of the first lens to an image plane of the camera optical lens along an optic axis.

In an improved embodiment, the camera optical lens further satisfies following conditions: $0.52 \leq (R3+R4)/(R3-R4) \leq 2.27$; and $0.02 \leq d3/TTL \leq 0.11$, where R3 denotes a central curvature radius of an object side surface of the second lens, R4 denotes a central curvature radius of an image side surface of the second lens, d3 denotes an on-axis thickness of the second lens, and TTL denotes a total optical length from the object side surface of the first lens to an image plane of the camera optical lens along an optic axis.

In an improved embodiment, the camera optical lens further satisfies following conditions: $2.77 \leq f3/f \leq 28.79$; and $0.05 \leq d5/TTL \leq 0.15$, where f3 denotes a focal length of the third lens, d5 denotes an on-axis thickness of the third lens, and TTL denotes a total optical length from the object side surface of the first lens to an image plane of the camera optical lens along an optic axis.

In an improved embodiment, the camera optical lens further satisfies following conditions: $0.28 \leq f4/f \leq 1.34$; $0.53 \leq (R7+R8)/(R7-R8) \leq 1.73$; and $0.05 \leq d7/TTL \leq 0.23$, where R7 denotes a central curvature radius of the object side surface of the fourth lens, R8 denotes a central curvature radius of the image side surface of the fourth lens, d7 denotes an on-axis thickness of the fourth lens, and TTL denotes a total optical length from the object side surface of the first lens to an image plane of the camera optical lens along an optic axis.

In an improved embodiment, the camera optical lens further satisfies following conditions: $-1.92 \leq f5/f \leq -0.33$; $0.57 \leq (R9+R10)/(R9-R10) \leq 2.10$; and $0.04 \leq d9/TTL \leq 0.22$, where d9 denotes an on-axis thickness of the fifth lens, and TTL denotes a total optical length from the object side surface of the first lens to an image plane of the camera optical lens along an optic axis.

In an improved embodiment, the camera optical lens further satisfies a following condition: $TTL/IH \leq 1.38$, where TTL denotes a total optical length from the object side surface of the first lens to an image plane of the camera optical lens along an optic axis, and IH denotes an image height of the camera optical lens.

In an improved embodiment, the camera optical lens further satisfies a following condition: $FOV \geq 83°$, where FOV denotes a field of view of the camera optical lens.

In an improved embodiment, the camera optical lens further satisfies a following condition: $FNO \leq 2.41$, where FNO denotes an F number of the camera optical lens.

The present invention at least have the following beneficial effects.

The camera optical lens provided by the present invention has excellent optical performance while meeting the design requirements of a large aperture, a wide angle and ultra-thinness, and is especially suitable for the mobile phone camera lens assembly and the WEB camera lens composed of imaging elements such as CCD and CMOS for high pixels.

BRIEF DESCRIPTION OF DRAWINGS

In order to more clearly illustrate technical solutions in embodiments of the present invention, the accompanying drawings used in the embodiments are briefly introduced as follows. It should be noted that the drawings described as follows are merely part of the embodiments of the present invention, and other drawings can also be acquired by those skilled in the art without paying creative efforts.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figures and the embodiments. It should be understood the specific embodiments described hereby is only to explain the invention, not intended to limit the invention.

Embodiment 1

Figure 1:
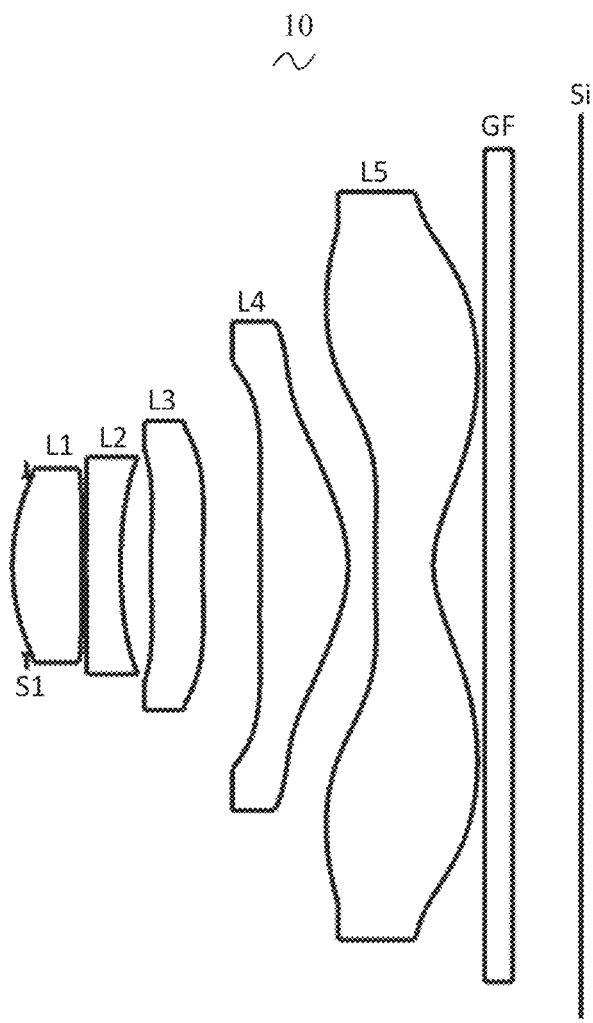
FIG. 1 is a schematic structural diagram of a camera optical lens according to Embodiment 1.

With reference to FIG. 1 to FIG. 4, Embodiment 1 of the present invention provides a camera optical lens 10. As shown in FIG. 1, a left side is an object side, and a right side is an image side. The camera optical lens 10 mainly includes five lenses. Specifically, the camera optical lens 10 includes, from the object side to the image side, an aperture S1, a first lens L1, a second lens L2, a third lens. L3, a fourth lens L4, and a fifth lens L5. Optical elements such as an optical filter GF or a glass plate may be provided between the fifth lens L5 and an image plane Si.

In this embodiment, the first lens L1 is made of a plastic material, the second lens L2 is made of a plastic material, the third lens L3 is made of a plastic material, the fourth lens L4 is made of a plastic material, and the fifth lens L5 is made of a plastic material. In other embodiments, the lenses may also be made of other materials.

In this embodiment, the first lens L1 has a positive refractive power, the second lens L2 has a negative refractive power, the third lens L3 has a positive refractive power, the fourth lens L4 has a positive refractive power, and the fifth lens L5 has a negative refractive power.

In this embodiment, it is defined that a focal length of the camera optical lens 10 is denoted by f, a focal length of the second lens L2 is denoted by f2, a focal length of the fourth lens L4 is denoted by f4, a focal length of the fifth lens L5 is denoted by f5, an on-axis distance from an image side surface of the third lens L3 to an object side surface of the fourth lens L4 is denoted by d6, an on-axis distance from an image side surface of the fourth lens L4 to an object side surface of the fifth lens L5 is denoted by d8, a central curvature radius of an object side surface of the first lens L1 is denoted by R1, a central curvature radius of an image side surface of the first lens L1 is denoted by R2, a central curvature radius of an object side surface of the fifth lens L5 is denoted by R9, a central curvature radius of an image side surface of the fifth lens L5 is denoted by R10, and the camera optical lens satisfies the following conditions:

$$-2.00 \leq f2/f \leq -1.25 \tag{1}$$

$$-1.50 \leq f4/f5 \leq -0.80 \tag{2}$$

$$1.50 \leq d6/d8 \leq 3.00 \tag{3}$$

$$-1.50 \leq (R1+R2)/(R1-R2) \leq -1.00 \tag{4}$$

$$6.00 \leq R9/R10 \leq 15.00 \tag{5}$$

Herein, the condition (1) specifies a ratio of the focal length of the second lens to the total focal length of the camera optical lens. Within a range defined by this condition, it is beneficial to improve image quality.

The condition (2) specifies a ratio of the focal length of the fourth lens to the focal length of the fifth lens. Within a range defined by this condition, it can effectively correct aberration.

Within a range defined by the condition (3), a position of the fourth lens can be effectively allocated, which is beneficial to installation of the lenses.

The condition (4) specifies a shape of the first lens. Within a range defined by this condition, it is beneficial to correct spherical aberration.

The condition (5) specifies a shape of the fifth lens. Within a range defined by this condition, it is beneficial to correct field curvature.

It is defined that a central curvature radius of an object side surface of the third lens L3 is denoted by R5, a central curvature radius of the image side surface of the third lens L3 is denoted by R6, and the camera optical lens further satisfies the following condition: $-10.00 \leq (R5+R6)/(R5-R6) \leq -2.00$, which specifies a shape of the third lens. Within a range defined by this condition, it is beneficial to alleviate a degree of deflection of light passing through the lens and effectively reduce aberration.

In this embodiment, the object side surface of the first lens L1 is a convex surface at a paraxial position, and the image side surface of the first lens L1 is a concave surface at a paraxial position.

It is defined that a focal length of the camera optical lens 10 is denoted by f, a focal length of the first lens L1 is denoted by f1, and the camera optical lens further satisfies the following condition: $0.38 \le f1/f \le 1.62$, which specifies a ratio of the focal length of the first lens to the focal length of the camera optical lens. Within a range defined by this condition, the first lens has an appropriate positive refractive power, which is beneficial to reduce aberration of the system, and beneficial to achieve ultra-thinness and a wide angle of the camera optical lens. Preferably, the camera optical lens satisfies the following condition: $0.61 \le f1/f \le 1.29$.

An on-axis thickness of the first lens L1 is denoted by d1, a total optical length from the object side surface of the first lens to the image plane of the camera optical lens 10 along an optic axis is denoted by TTL, and the camera optical lens further satisfies the following condition: $0.05 \le d1/TTL \le 0.18$. Within a range defined by this condition, it is beneficial to achieve ultra-thinness. Preferably, the camera optical lens further satisfies the following condition: $0.08 \le d1/TTL \le 0.15$.

In this embodiment, the object side surface of the second lens L2 is a convex surface at a paraxial position, and the image side surface of the second lens L2 is a concave surface at a paraxial position.

It is defined that a central curvature radius of the object side surface of the second lens L2 is denoted by R3, a central curvature radius of the image side surface of the second lens L2 is denoted by R4, and the camera optical lens further satisfies the following condition: $0.52 \le (R3+R4)/(R3-R4) \le 2.27$, which specifies a shape of the second lens L2. Within a range defined by this condition, with the development of ultra-thinness and wide angle of the camera optical lens, it is beneficial to correct longitudinal aberration. Preferably, the camera optical lens further satisfies the following condition: $0.83 \le (R3+R4)/(R3-R4) \le 1.82$.

An on-axis thickness of the second lens L2 is denoted by d3, the total optical length from the object side surface of the first lens to the image plane of the camera optical lens 10 along the optic axis is denoted by TTL, and the camera optical lens further satisfies the following condition: $0.02 \le d3/TTL \le 0.11$. Within a range defined by this condition, it is beneficial to achieve ultra-thinness. Preferably, the camera optical lens further satisfies the following condition: $0.04 \le d3/TTL \le 0.09$.

In this embodiment, the object side surface of the third lens L3 is a convex surface at a paraxial position, and the image side surface of the third lens L3 is a concave surface at a paraxial position.

It is defined that a focal length of the third lens L3 is denoted by f3, a focal length of the camera optical lens 10 is denoted by f, and the camera optical lens further satisfies the following condition: $2.77 \le f3/f \le 28.79$. Reasonable allocation of refractive power enables the system to have better imaging quality and lower sensitivity. Preferably, the camera optical lens further satisfies the following condition: $4.43 \le f3/f \le 23.04$.

An on-axis thickness of the third lens L3 is denoted by d5, the total optical length from the object side surface of the first lens to the image plane of the camera optical lens 10 along the optic axis is denoted by TTL, and the camera optical lens further satisfies the following condition: $0.05 \le d5/TTL \le 0.15$. Within a range defined by this condition, it is beneficial to achieving ultra-thinness. Preferably, the camera optical lens further satisfies the following condition: $0.07 \le d5/TTL \le 0.12$.

In this embodiment, the object side surface of the fourth lens L4 is a concave surface at a paraxial position, and the image side surface of the fourth lens L4 is a convex surface at a paraxial position.

It is defined that a focal length of the fourth lens L4 is denoted by f4, a focal length of the camera optical lens 10 is denoted by f, and the camera optical lens further satisfies the following condition: $0.28 \le f4/f \le 1.34$, which specifies a ratio of the focal length of the fourth lens to the focal length of the system. Within a range defined by this condition, it is beneficial to improve performance of the optical system. Preferably, the camera optical lens further satisfies the following condition: $0.45 \le f4/f \le 1.07$.

A central curvature radius of the object side surface of the fourth lens L4 is denoted by R7, a central curvature radius of the image side surface of the fourth lens L4 is denoted by R8, and the camera optical lens further satisfies the following condition: $0.53 \le (R7+R8)/(R7-R8) \le 1.73$, which specifies a shape of the fourth lens L4. Within a range defined by this condition, with the development of ultra-thinness and wide angle of the camera optical lens, it is beneficial to correct off-axis aberration. Preferably, the camera optical lens further satisfies the following condition: $0.85 \le (R7+R8)/(R7-R8) \le 1.38$.

An on-axis thickness of the fourth lens L4 is denoted by d7, the total optical length from the object side surface of the first lens to the image plane of the camera optical lens 10 along the optic axis is denoted by TTL, and the camera optical lens further satisfies the following condition: $0.05 \le d7/TTL \le 0.23$. Within a range defined by this condition, it is beneficial to achieving ultra-thinness. Preferably, the camera optical lens further satisfies the following condition: $0.08 \le d7/TTL \le 0.19$.

In this embodiment, the object side surface of the fifth lens L5 is a convex surface at a paraxial position, and the image side surface of the fifth lens L5 is a concave surface at a paraxial position.

It is defined that a focal length of the fifth lens L5 is denoted by f5, a focal length of the camera optical lens is denoted by f, and the camera optical lens further satisfies the following condition: $-1.92 \le f5/f \le -0.33$. The limitation on the fifth lens L5 can effectively smooth a light angle of the camera lens and reduce tolerance sensitivity. Preferably, the camera optical lens further satisfies the following condition: $-1.20 \le f5/f \le -0.42$.

A central curvature radius of the object side surface of the fifth lens L5 is denoted by R9, a central curvature radius of the image side surface of the fifth lens L5 is denoted by R10, and the camera optical lens further satisfies the following condition: $0.57 \le (R9+R10)/(R9-R10) \le 2.10$, which specifies a shape of the fifth lens L5. Within a range defined this condition, with the development of ultra-thinness and wide angle, it is beneficial to correct off-axis aberration. Preferably, the camera optical lens further satisfies the following condition: $0.91 \le (R9+R10)/(R9-R10) \le 1.68$.

An on-axis thickness of the fifth lens L5 is denoted by d9, the total optical length from the object side surface of the first lens to the image plane of the camera optical lens 10 along the optic axis is denoted by TTL, and the camera optical lens further satisfies the following condition: $0.04 \le d9/TTL \le 0.22$. Within a range defined by this condition, it is beneficial to achieve ultra-thinness. Preferably, the camera optical lens further satisfies the following condition: 0.07≤d9/TTL≤0.17.

In this embodiment, an F number (FNO) of the camera optical lens 10 is smaller than or equal to 2.41, so as to achieve a large aperture.

In this embodiment, a field of view (FOV) of the camera optical lens 10 is greater than or equal to 83°, so as to achieve a wide angle.

In this embodiment, the total optical length from the object side surface of the first lens to the image plane of the camera optical lens 10 along the optic axis is denoted by TTL, an image height of the camera optical lens 10 is denoted by IH, and the camera optical lens further satisfies the following condition: TTL/IH≤1.38, so as to achieve ultra-thinness.

When the focal length of the camera optical lens 10, and the focal length and the central curvature radius of each lens according to the present invention satisfy the above-mentioned conditions, the camera optical lens 10 can have good optical performance while satisfying the design requirements of a large aperture, a wide angle, and ultra-thinness. According to the characteristics of the camera optical lens 10, the camera optical lens 10 is especially suitable for the mobile phone camera lens assembly and the WEB camera lens composed of imaging elements such as CCD and CMOS for high pixels.

In addition, in the camera optical lens 10 provided by this embodiment, the surfaces of the respective lenses can be designed as aspherical surfaces. The aspherical surface is easily made into a shape other than a spherical surface, and more control variables can be obtained to reduce aberration, thereby reducing an amount of lens used. Therefore, a total length of the camera optical lens 10 can be effectively reduced. In this embodiment, the object side surface and the image side surface of each of the lenses are aspherical surfaces.

It should be noted that, since the first lens L1, the second lens L2, the third lens L3, the fourth lens L4, and the fifth lens L5 have the structures and parameter relationships described above, the camera optical lens 10 can reasonably allocate the refractive power, spacing and shape of respective lens, thereby correcting various aberrations.

The following description will illustrate the camera optical lens 10 of the present invention with examples. The symbols described in each example are as follows. The focal length, the on-axis distance, the central curvature radius, the on-axis thickness, the inflection point position, and stagnation point position are all expressed in unit of mm.

TTL: a total optical length (an on-axis distance from an object side surface of the first lens L1 to the image surface Si along an optic axis), in unit of mm.

FNO: F number (a ratio of an effective focal length of the camera optical lens to an entrance pupil diameter).

In addition, at least one of the object side surface and the image side surface of each lens may also be provided with an inflection point and/or stagnation point, so as to meet requirements of high-quality imaging. For detailed implementation manners, please refer to the following description.

FIG. 1 shows design data of the camera optical lens 10.

For each of the first lens L1 to the optical filter GF constituting the camera optical lens 10 according to Embodiment 1 of the present invention, Table 1 lists the central curvature radius R of the object side surface and the central curvature radius R of the image side surface, an on-axis thickness, a distance d between two adjacent lenses, a refractive index nd and an abbe number vd. It should be noted that in this embodiment, R and d are both expressed in unit of millimeters (mm).

TABLE 1

|  | R | d |  | nd |  | vd |
|---|---|---|---|---|---|---|
| S1 | ∞ | d0 = | −0.106 |  |  |  |
| R1 | 1.634 | d1 = | 0.523 | nd1 | 1.5444 | v1 | 55.82 |
| R2 | 71.404 | d2 = | 0.034 |  |  |  |
| R3 | 52.044 | d3 = | 0.260 | nd2 | 1.6610 | v2 | 20.53 |
| R4 | 3.298 | d4 = | 0.230 |  |  |  |
| R5 | 6.468 | d5 = | 0.392 | nd3 | 1.5444 | v3 | 55.82 |
| R6 | 9.001 | d6 = | 0.432 |  |  |  |
| R7 | −25.512 | d7 = | 0.666 | nd4 | 1.5346 | v4 | 55.69 |
| R8 | −0.984 | d8 = | 0.204 |  |  |  |
| R9 | 9.104 | d9 = | 0.440 | nd5 | 1.5346 | v5 | 55.69 |
| R10 | 0.819 | d10 = | 0.390 |  |  |  |
| R11 | ∞ | d11 = | 0.210 | ndg | 1.5168 | vg | 64.17 |
| R12 | ∞ | d12 = | 0.515 |  |  |  |

The symbols in the above table are defined as follows.

S1: aperture;

R: central curvature radius at a center of an optical surface

R1: central curvature radius of an object side surface of a first lens L1;

R2: central curvature radius of an image side surface of the first lens L1;

R3: central curvature radius of an object side surface of a second lens L2;

R4: central curvature radius of an image side surface of the second lens L2;

R5: central curvature radius of an object side surface of a third lens L3;

R6: central curvature radius of an image side surface of the third lens L3;

R7: central curvature radius of an object side surface of a fourth lens L4;

R8: central curvature radius of an image side surface of the fourth lens L4;

R9: central curvature radius of an object side surface of a fifth lens L5;

R10: central curvature radius of an image side surface of the fifth lens L5;

R11: curvature radius of an object side surface of an optical filter GF;

R12: curvature radius of an image side surface of the optical filter GF;

d: on-axis thickness of a lens, on-axis distance between adjacent lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the sixth lens L5 to the object side surface of the optical filter GF;

d11: on-axis thickness of the glass plate GF;
d12: on-axis distance from the image side surface of the optical filter to an image plane;
nd: refractive index of d-line;
nd1: refractive index of d-line of the first lens L1;
nd2: refractive index of d-line of the second lens L2;
nd3: refractive index of d-line of the third lens L3;
nd4: refractive index of d-line of the fourth lens L4;
nd5: refractive index of d-line of the fifth lens L5;
ndg: refractive index of d-line of the glass plate GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the glass plate GF.

Table 2 shows aspherical surface data of the respective lenses in the camera optical lens 10 according to Embodiment 1 of the present invention.

Table 3 and Table 4 show the design data of the inflection point and the stagnation point of each lens in the camera optical lens 10 according to this embodiment. Herein, P1R1 and P1R2 respectively represent the object side surface and image side surface of the first lens L1; P2R1 and P2R2 respectively represent the object side surface and image side surface of the second lens L2; P3R1 and P3R2 respectively represent the object side surface and the image side surface of the third lens L3; P4R1 and P4R2 respectively represent the object side surface and image side surface of the fourth lens L4; and P5R1 and P5R2 respectively represent the object side surface and image side surface of the fifth lens L5. The corresponding data in the "inflection point position" column is a vertical distance from the inflection point set on a surface of each lens to the optic axis of the camera optical lens 10. The corresponding data in the "stagnation point position" column is a vertical distance from the stagnation point set on a surface of each lens to the optic axis of the camera optical lens 10.

TABLE 2

| | Cone coefficient | Aspherical coefficient | | | | |
|---|---|---|---|---|---|---|
| | k | A4 | A6 | A8 | A10 | A12 |
| R1 | −1.8092E+00 | 5.9187E−02 | 5.2260E−01 | −1.0770E+01 | 9.0365E+01 | −4.2605E+02 |
| R2 | −2.8376E+04 | −9.5887E−02 | −9.0582E−02 | 7.9878E+00 | −7.5384E+01 | 3.4288E+02 |
| R3 | −4.5034E+04 | −9.2755E−02 | 6.6466E−01 | 1.0565E−02 | −2.1363E+01 | 1.1902E+02 |
| R4 | −1.8508E+00 | 5.1259E−02 | −9.2961E−01 | 8.9564E+00 | −4.0400E+01 | 1.0535E+02 |
| R5 | −2.5566E+02 | −6.2541E−02 | −1.2845E+00 | 1.0526E+01 | −4.8493E+01 | 1.3584E+02 |
| R6 | 3.5743E+01 | −1.8637E−01 | 1.8956E−01 | −1.2095E+00 | 4.3685E+00 | −9.3763E+00 |
| R7 | 2.5679E+02 | 8.1917E−02 | 9.0680E−03 | −3.5136E−01 | 6.0023E−01 | −5.0862E−01 |
| R8 | −4.7578E+00 | 2.2560E−02 | 8.0566E−02 | −3.2161E−01 | 4.0270E−01 | −2.4658E−01 |
| R9 | −4.0595E+01 | −4.4732E−02 | −2.2282E−01 | 2.2657E−01 | −1.0158E−01 | 2.6351E−02 |
| R10 | −4.2682E+00 | −1.2113E−01 | 5.2228E−02 | −1.5661E−02 | 3.2314E−03 | −4.6332E−04 |

| | Cone coefficient | Aspherical coefficient | | | |
|---|---|---|---|---|---|
| | k | A14 | A16 | A18 | A20 |
| R1 | −1.8092E+00 | 1.2137E+03 | −2.0802E+03 | 1.9767E+03 | −8.0003E+02 |
| R2 | −2.8376E+04 | −8.9152E+02 | 1.3533E+03 | −1.1159E+03 | 3.8496E+02 |
| R3 | −4.5034E+04 | −3.1951E+02 | 4.7480E+02 | −3.7339E+02 | 1.2081E+02 |
| R4 | −1.8508E+00 | −1.6604E+02 | 1.5554E+02 | −7.9074E+01 | 1.6611E+01 |
| R5 | −2.5566E+02 | −2.3531E+02 | 2.4500E+02 | −1.4010E+02 | 3.3780E+01 |
| R6 | 3.5743E+01 | 1.2284E+01 | −9.6823E+00 | 4.2135E+00 | −7.7033E−01 |
| R7 | 2.5679E+02 | 2.4178E−01 | −6.2936E−02 | 7.5642E−03 | −1.9824E−04 |
| R8 | −4.7578E+00 | 8.4021E−02 | −1.6236E−02 | 1.6497E−03 | −6.7080E−05 |
| R9 | −4.0595E+01 | −4.2259E−03 | 4.1505E−04 | −2.2952E−05 | 5.4819E−07 |
| R10 | −4.2682E+00 | 4.5600E−05 | −3.3683E−06 | 2.1500E−07 | −8.1146E−09 |

In Table 2, k represents a cone coefficient, and A4, A6, A8, A10, A12, A14, A16, A18, and A20 represents aspherical coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (6)$$

In the equation (6), x represents a vertical distance between a point on an aspherical curve and an optic axis, and y represents an aspherical depth (a vertical distance between a point on the aspherical surface that is distanced from the optic axis by x and a surface tangent to a vertex of the aspherical surface on the optic axis).

For convenience, the aspherical surface of each lens adopts the aspherical surface specified by the above-mentioned equation (6). However, the present invention is not limited to the aspherical surface polynomial form represented by the equation (6).

TABLE 3

| | Number of inflection points | Inflection point position 1 | Inflection point position 2 | Inflection point position 3 | Inflection point position 4 |
|---|---|---|---|---|---|
| P1R1 | 0 | / | / | / | / |
| P1R2 | 1 | 0.115 | / | / | / |
| P2R1 | 4 | 0.135 | 0.265 | 0.465 | 0.495 |
| P2R2 | 0 | / | / | / | / |
| P3R1 | 1 | 0.245 | / | / | / |
| P3R2 | 2 | 0.245 | 1.005 | / | / |
| P4R1 | 3 | 0.205 | 0.615 | 1.505 | / |
| P4R2 | 3 | 0.955 | 1.515 | 1.865 | / |
| P5R1 | 3 | 0.315 | 1.245 | 2.535 | / |
| P5R2 | 3 | 0.555 | 2.465 | 2.785 | / |

TABLE 4

|  | Number of stagnation points | Stagnation point position 1 | Stagnation point position 2 |
|---|---|---|---|
| P1R1 | 0 | / | / |
| P1R2 | 1 | 0.195 | / |
| P2R1 | 0 | / | / |
| P2R2 | 0 | / | / |
| P3R1 | 1 | 0.445 | / |
| P3R2 | 1 | 0.405 | / |
| P4R1 | 2 | 0.365 | 0.775 |
| P4R2 | 0 | / | / |
| P5R1 | 2 | 0.505 | 1.995 |
| P5R2 | 1 | 1.495 | / |

In addition, the values corresponding to the various parameters and the parameters already specified in the conditions for each of Embodiments 1-4 are listed in Table 17.

As shown in Table 17, Embodiment 1 satisfies the respective conditions.

Figure 2:
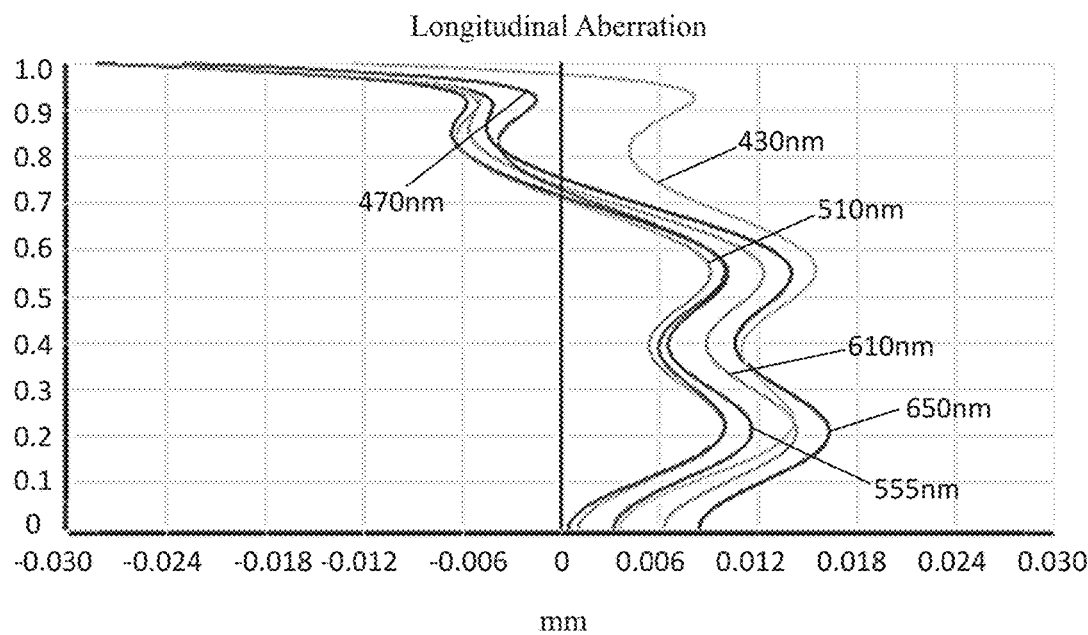
FIG. 2 is a schematic diagram of longitudinal aberration of the camera optical lens shown in FIG. 1.
Figure 3:
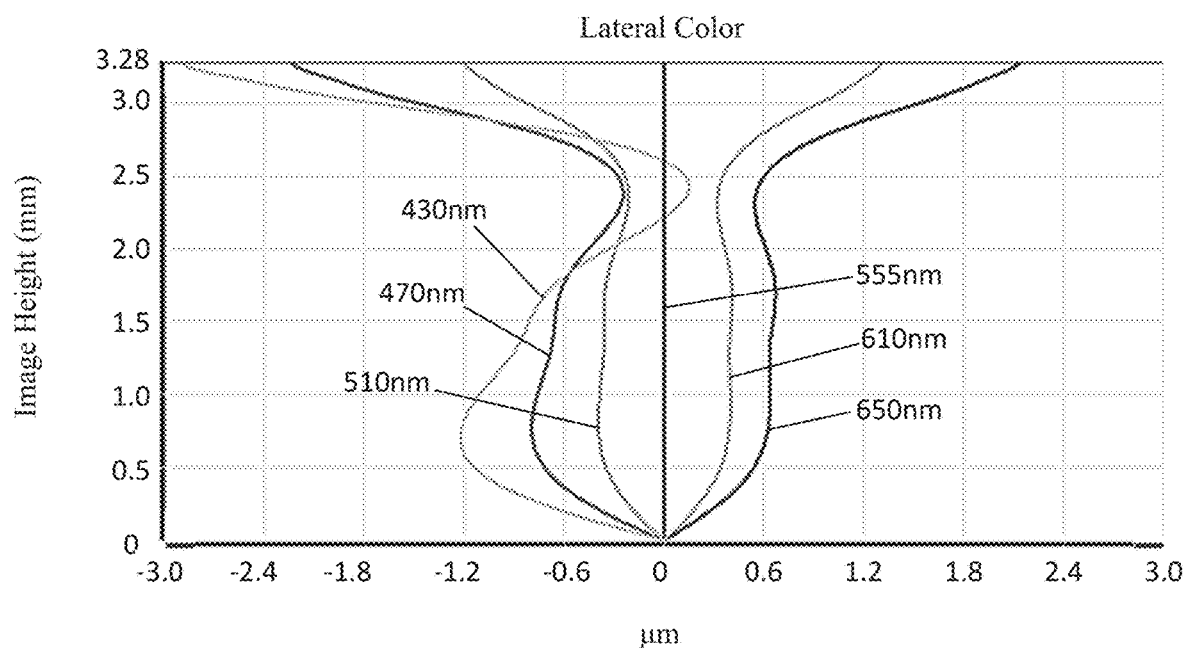
FIG. 3 is a schematic diagram of lateral color of the camera optical lens shown in FIG. 1.
Figure 4:
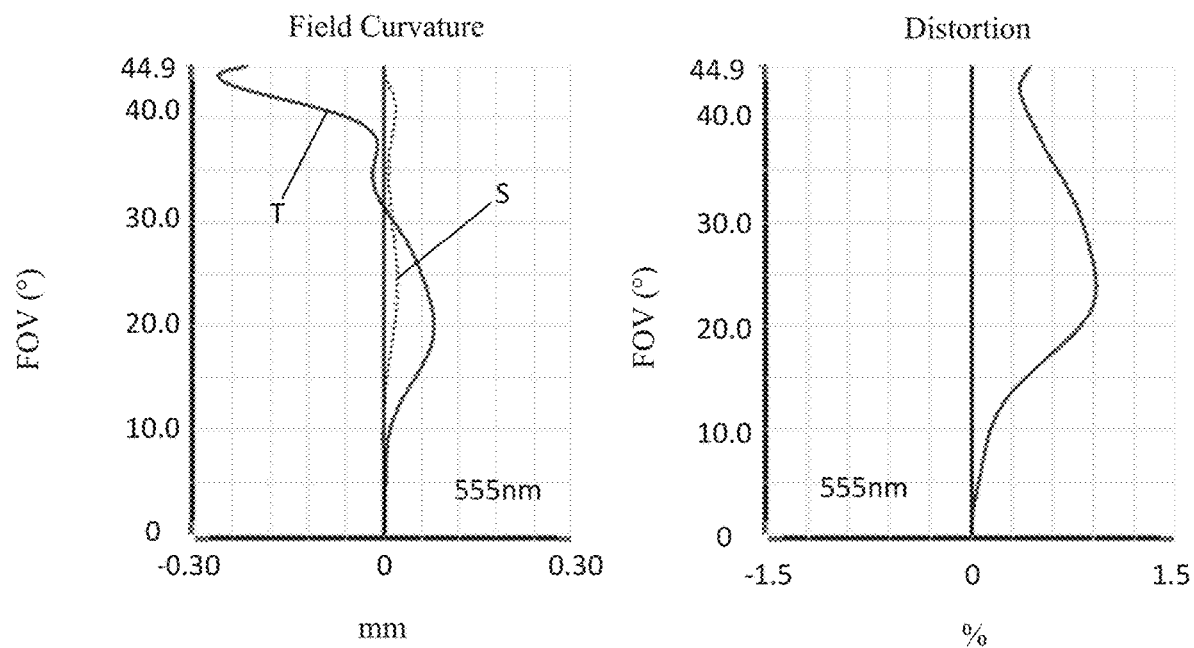
FIG. 4 is a schematic diagram of field curvature and distortion of the camera optical lens shown in FIG. 1.

FIG. 2 and FIG. 3 respectively show schematic diagrams of longitudinal aberration and lateral color of light having wavelengths of 650 nm, 610 nm, 555 nm, 510 nm, 470 nm, and 430 mm after passing through the camera optical lens 10. FIG. 4 shows a schematic diagram of field curvature and distortion of light having a wavelength of 555 nm after passing through the camera optical lens 10. In FIG. 4, the field curvature S is the field curvature in a sagittal direction, and the field curvature T is the field curvature in a meridian direction.

In this embodiment, an entrance pupil diameter ENPD of the camera optical lens 10 is 1.352 mm, the full field of view image height IH is 3.282 mm, and the FOV in a diagonal direction is 89.80°, so that the camera optical lens 10 can meet the design requirements of a large aperture, a wide angle and ultra-thinness. The on-axis and off-axis color aberrations are fully corrected, and the camera optical lens 10 has excellent optical performance.

Embodiment 2

Figure 5:
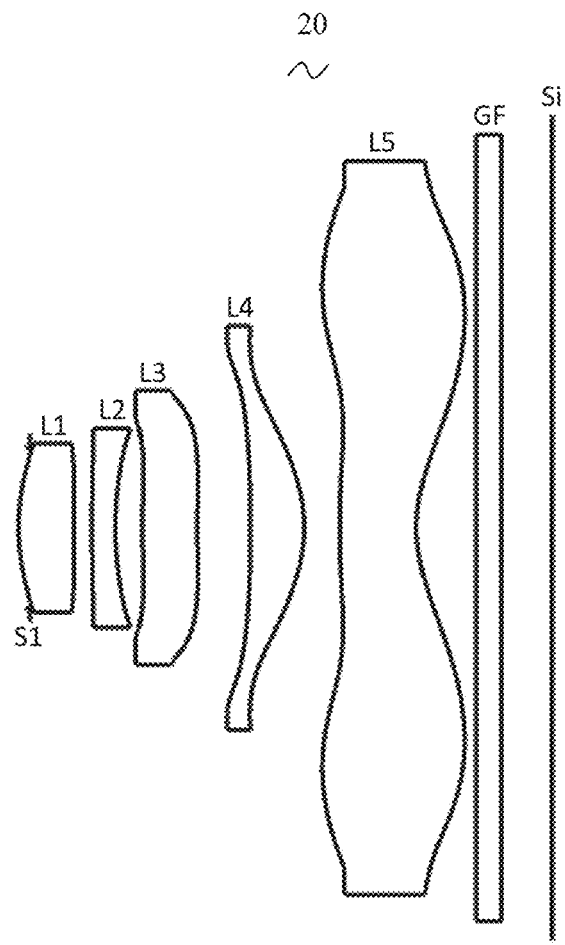
FIG. 5 is a schematic structural diagram of a camera optical lens according to Embodiment 2.

FIG. 5 is a schematic structural diagram of a camera optical lens 20 according to Embodiment 2. Embodiment 2 is basically the same as Embodiment 1, the symbols listed in the following tables have the same representation as Embodiment 1, therefore, the same part will not be repeated herein, and only a difference from Embodiment 1 will be described in the following.

Table 5 and Table 6 show the design data of the camera optical lens 20 according to Embodiment 2 of the present invention.

TABLE 5

|  | R |  | d | nd |  | vd |
|---|---|---|---|---|---|---|
| S1 | ∞ | d0 = | −0.094 |  |  |  |
| R1 | 1.896 | d1 = | 0.467 | nd1 | 1.5444 v1 | 55.82 |
| R2 | 4008.341 | d2 = | 0.150 |  |  |  |
| R3 | 14.280 | d3 = | 0.198 | nd2 | 1.6610 v2 | 20.53 |
| R4 | 2.930 | d4 = | 0.224 |  |  |  |
| R5 | 6.808 | d5 = | 0.460 | nd3 | 1.5444 v3 | 55.82 |
| R6 | 8.322 | d6 = | 0.447 |  |  |  |
| R7 | −27.928 | d7 = | 0.452 | nd4 | 1.5346 v4 | 55.69 |
| R8 | −1.279 | d8 = | 0.298 |  |  |  |
| R9 | 8.049 | d9 = | 0.645 | nd5 | 1.5346 v5 | 55.69 |
| R10 | 1.340 | d10 = | 0.460 |  |  |  |
| R11 | ∞ | d11 = | 0.210 | ndg | 1.5168 vg | 64.17 |
| R12 | ∞ | d12 = | 0.466 |  |  |  |

Table 6 shows the aspherical surface data of the respective lenses in the camera optical lens 20 according to Embodiment 2 of the present invention.

TABLE 6

|  | Cone coefficient | Aspherical coefficient | | | | |
|---|---|---|---|---|---|---|
|  | k | A4 | A6 | A8 | A10 | A12 |
| R1 | −3.1046E+00 | 1.2600E−02 | 5.3998E−01 | −6.7589E+00 | 4.7704E+01 | −2.1327E+02 |
| R2 | 1.1188E+03 | −5.5555E−02 | 1.2124E−01 | −2.0837E+00 | 1.4262E+01 | −6.0279E+01 |
| R3 | −1.5241E+03 | −2.6526E−03 | 3.9127E−01 | −4.0522E+00 | 2.1167E+01 | −6.8515E+01 |
| R4 | −6.5132E+00 | −7.1739E−02 | 8.9276E−01 | −4.6677E+00 | 1.6711E+01 | −4.0220E+01 |
| R5 | −1.9466E+02 | −1.9007E−01 | 3.8530E−01 | −5.5423E−01 | −2.5036E+00 | 1.5277E+01 |
| R6 | −2.6007E+01 | −2.2772E−01 | 9.5797E−02 | 7.9377E−01 | −3.8093E+00 | 8.3022E+00 |
| R7 | 2.2419E+02 | −8.8407E−02 | 5.6587E−02 | 1.5368E−01 | −4.1115E−01 | 4.5914E−01 |
| R8 | −3.4428E+00 | −2.2028E−02 | −5.8012E−02 | 1.9961E−01 | −2.6412E−01 | 2.1479E−01 |
| R9 | −1.0167E+00 | 3.1575E−02 | −1.3493E−01 | 8.8713E−02 | −2.9053E−02 | 5.6830E−03 |
| R10 | −2.1958E+00 | −8.0608E−02 | 9.0596E−03 | 5.3924E−03 | −2.9923E−03 | 7.2111E−04 |
|  | Cone coefficient | Aspherical coefficient | | | |
|  | k | A14 | A16 | A18 | A20 |
| R1 | −3.1046E+00 | 6.0393E+02 | −1.0508E+03 | 1.0245E+03 | −4.2855E+02 |
| R2 | 1.1188E+03 | 1.5416E+02 | −2.3276E+02 | 1.9140E+02 | −6.5828E+01 |
| R3 | −1.5241E+03 | 1.3905E+02 | −1.7015E+02 | 1.1518E+02 | −3.3468E+01 |
| R4 | −6.5132E+00 | 6.3275E+01 | −6.1621E+01 | 3.3599E+01 | −7.8462E+00 |
| R5 | −1.9466E+02 | −3.8099E+01 | 5.1639E+01 | −3.7388E+01 | 1.1414E+01 |
| R6 | −2.6007E+01 | −1.0694E+01 | 8.2854E+00 | −3.5846E+00 | 6.6865E−01 |
| R7 | 2.2419E+02 | −2.9589E−01 | 1.1239E−01 | −2.3090E−02 | 1.9682E−03 |
| R8 | −3.4428E+00 | −1.0561E−01 | 3.0035E−02 | −4.5305E−03 | 2.8014E−04 |
| R9 | −1.0167E+00 | −6.9529E−04 | 5.2317E−05 | −2.2186E−06 | 4.0609E−08 |
| R10 | −2.1958E+00 | −1.0121E−04 | 8.5574E−06 | −4.0312E−07 | 8.0782E−09 |

Table 7 and Table 8 show the design data of the inflection point and stagnation point of each lens in the camera optical lens 20.

TABLE 7

| | Number of inflection points | Inflection point position 1 | Inflection point position 2 | Inflection point position 3 |
|---|---|---|---|---|
| P1R1 | 1 | 0.685 | / | / |
| P1R2 | 1 | 0.025 | / | / |
| P2R1 | 2 | 0.455 | 0.625 | / |
| P2R2 | 0 | / | / | / |
| P3R1 | 2 | 0.255 | 0.875 | / |
| P3R2 | 2 | 0.225 | 1.085 | / |
| P4R1 | 1 | 1.355 | / | / |
| P4R2 | 1 | 0.915 | / | / |
| P5R1 | 2 | 0.545 | 1.445 | / |
| P5R2 | 3 | 0.785 | 2.575 | 2.995 |

TABLE 8

| | Number of stagnation points | Stagnation point position 1 | Stagnation point position 2 |
|---|---|---|---|
| P1R1 | 0 | / | / |
| P1R2 | 1 | 0.035 | / |
| P2R1 | 0 | / | / |
| P2R2 | 0 | / | / |
| P3R1 | 1 | 0.465 | / |
| P3R2 | 1 | 0.395 | / |
| P4R1 | 1 | 1.575 | / |
| P4R2 | 1 | 1.575 | / |
| P5R1 | 2 | 0.835 | 2.015 |
| P5R2 | 1 | 1.795 | / |

In addition, the values corresponding to the various parameters and the parameters specified in the respective conditions in Embodiment 2 are also listed in Table 17. It can be seen that the camera optical lens according to this embodiment satisfies the above-mentioned conditions.

Figure 6:
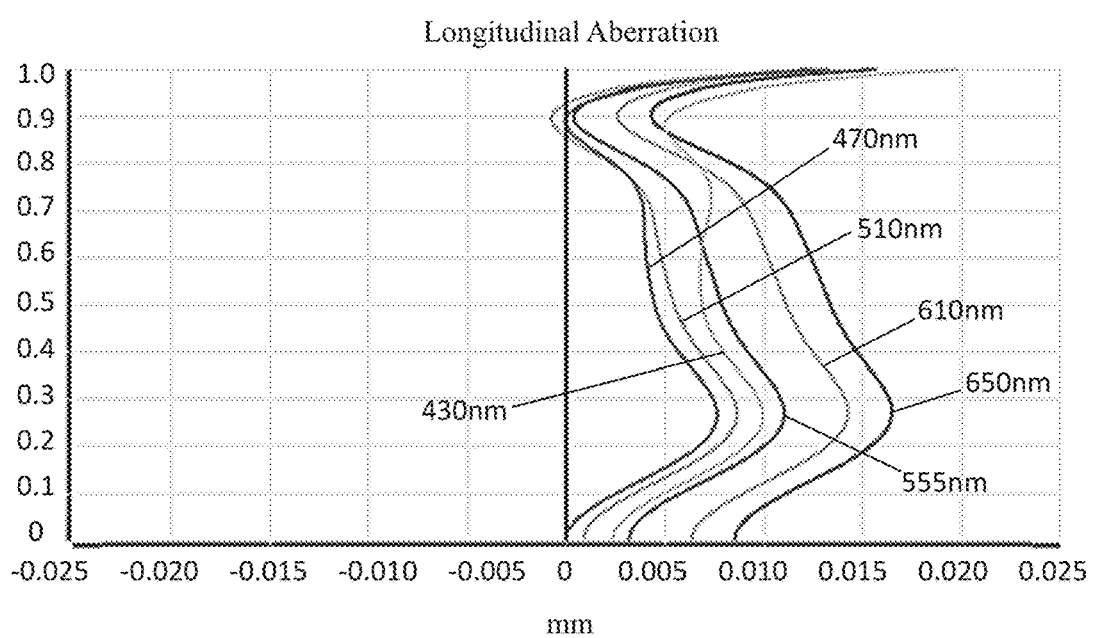
FIG. 6 is a schematic diagram of longitudinal aberration of the camera optical lens shown in FIG. 5.
Figure 7:
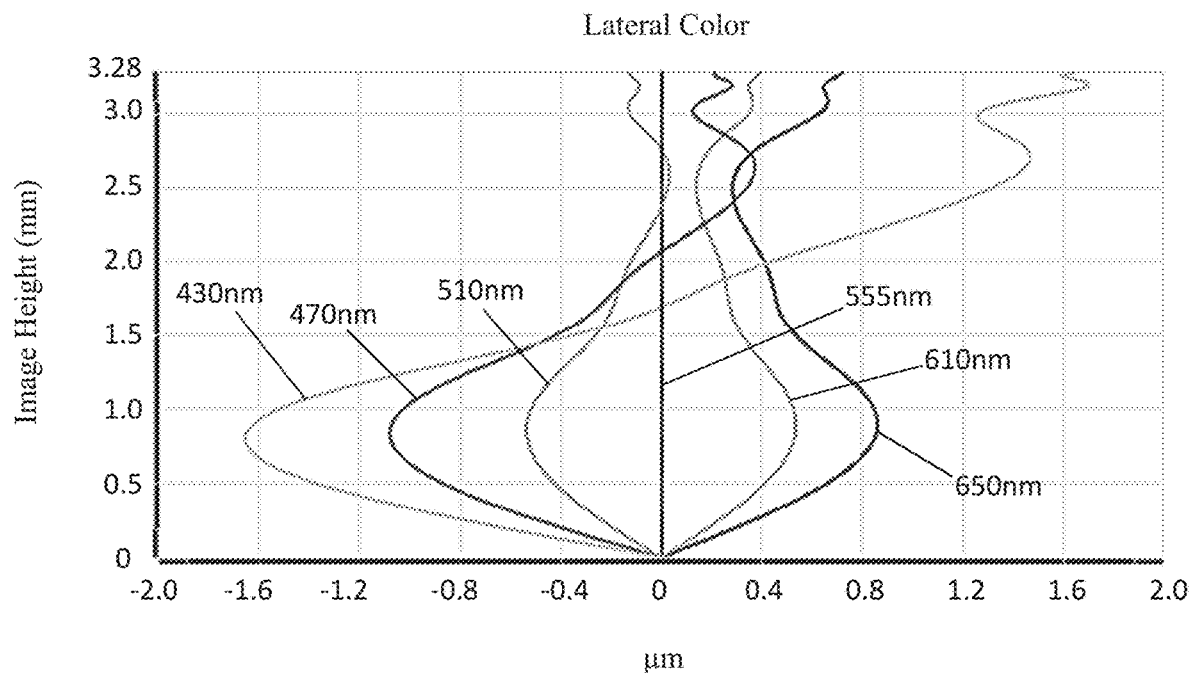
FIG. 7 is a schematic diagram of lateral color of the camera optical lens shown in FIG. 5.
Figure 8:
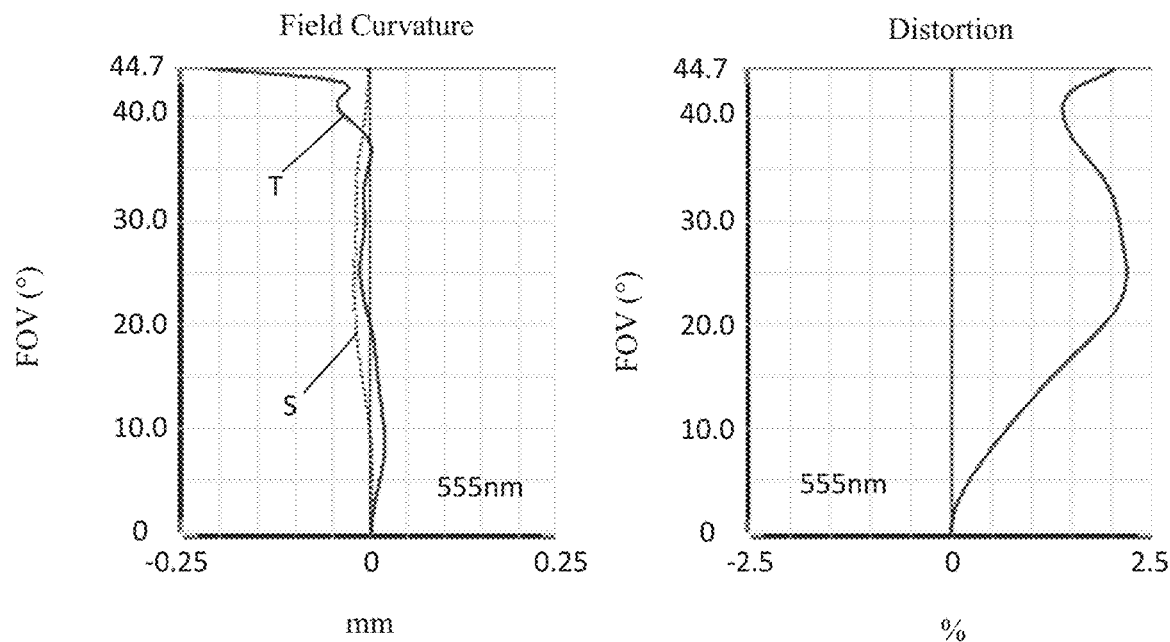
FIG. 8 is a schematic diagram of field curvature and distortion of the camera optical lens shown in FIG. 5.

FIG. 6 and FIG. 7 respectively show schematic diagrams of longitudinal aberration and lateral color of light having wavelengths of 650 nm, 610 nm, 555 nm, 510 nm, 470 nm, and 430 mm after passing through the camera optical lens 20. FIG. 8 shows a schematic diagram of field curvature and distortion of light having a wavelength of 555 nm after passing through the camera optical lens 20. In FIG. 8, the field curvature S is the field curvature in a sagittal direction, and the field curvature T is the field curvature in a meridian direction.

In this embodiment, an entrance pupil diameter ENPD of the camera optical lens 20 is 1.343 mm, the full field of view image height IH is 3.282 mm, and the FOV in a diagonal direction is 89.40°, so that the camera optical lens 20 can meet the design requirements of a large aperture, a wide angle and ultra-thinness. The on-axis and off-axis color aberrations are fully corrected, and the camera optical lens 20 has excellent optical performance.

Embodiment 3

Figure 9:
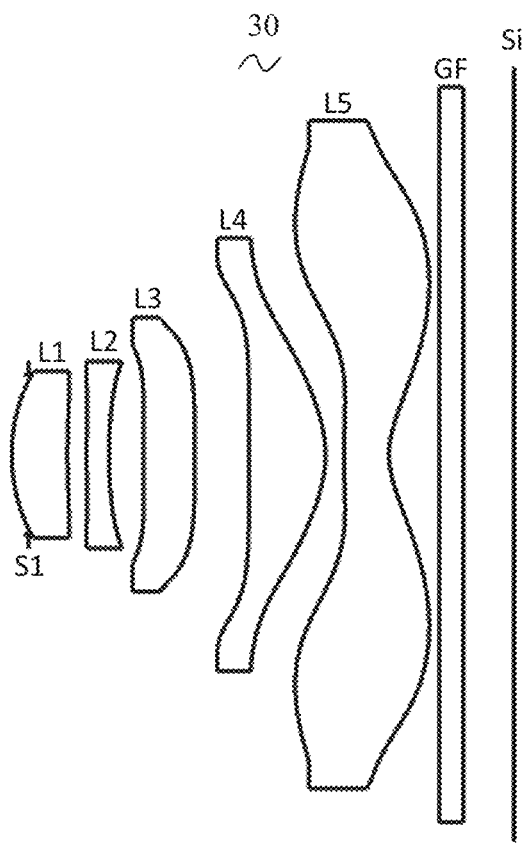
FIG. 9 is a schematic structural diagram of a camera optical lens according to Embodiment 3.

FIG. 9 is a schematic structural diagram of a camera optical lens 30 according to Embodiment 3. Embodiment 3 is basically the same as Embodiment 1, the symbols listed in the following tables have the same representation as Embodiment 1, therefore, the same part will not be repeated herein, and only the difference from Embodiment will be described in the following.

Table 9 and Table 10 show the design data of the camera optical lens 30 according to Embodiment 3 of the present invention.

TABLE 9

| | R | d | | nd | | vd |
|---|---|---|---|---|---|---|
| S1 | ∞ | d0 = | −0.150 | | | |
| R1 | 1.540 | d1 = | 0.498 | nd1 | 1.5444 v1 | 55.82 |
| R2 | 7.760 | d2 = | 0.172 | | | |
| R3 | 27.576 | d3 = | 0.198 | nd2 | 1.6610 v2 | 20.53 |
| R4 | 3.908 | d4 = | 0.310 | | | |
| R5 | 13.031 | d5 = | 0.454 | nd3 | 1.5444 v3 | 55.82 |
| R6 | 38.962 | d6 = | 0.488 | | | |
| R7 | −34.379 | d7 = | 0.682 | nd4 | 1.5346 v4 | 55.69 |
| R8 | −1.014 | d8 = | 0.163 | | | |
| R9 | 4.437 | d9 = | 0.403 | nd5 | 1.5346 v5 | 55.69 |
| R10 | 0.739 | d10 = | 0.389 | | | |
| R11 | ∞ | d11 = | 0.210 | ndg | 1.5168 vg | 64.17 |
| R12 | ∞ | d12 = | 0.513 | | | |

Table 10 shows the aspherical surface data of the respective lenses in the camera optical lens 30 according to Embodiment 3 of the present invention.

TABLE 10

| | Cone coefficient | Aspherical coefficient | | | | |
|---|---|---|---|---|---|---|
| | k | A4 | A6 | A8 | A10 | A12 |
| R1 | −1.2140E+00 | 3.1663E−02 | 2.6870E−01 | −2.5783E+00 | 1.4865E+01 | −5.3450E+01 |
| R2 | 9.4058E+01 | −7.3308E−02 | 2.5478E−01 | −3.7706E+00 | 2.6671E+01 | −1.1775E+02 |
| R3 | −1.7054E+04 | 2.0955E−02 | −3.9567E−01 | 2.4523E+00 | −1.0628E+01 | 3.0908E+01 |
| R4 | −3.7054E+00 | −2.5330E−02 | 4.0135E−01 | −1.8413E+00 | 7.3780E+00 | −2.0269E+01 |
| R5 | 1.6150E+02 | −1.4740E−01 | −7.1213E−02 | 7.8252E−01 | −3.5834E+00 | 9.4101E+00 |
| R6 | 4.8139E+02 | −1.1736E−01 | −4.5249E−02 | 2.1987E−01 | −7.1300E−01 | 1.3953E+00 |
| R7 | 2.3756E+02 | 3.6142E−02 | −6.0342E−02 | 1.3805E−02 | 6.3363E−03 | 4.2511E−03 |
| R8 | −4.6297E+00 | −1.4788E−02 | −2.3448E−03 | −4.6745E−02 | 7.4044E−02 | −4.7199E−02 |
| R9 | −1.7333E+02 | −1.3392E−01 | −3.8564E−02 | 6.9800E−02 | −3.0028E−02 | 6.8582E−03 |
| R10 | −4.5261E+00 | −1.1751E−01 | 6.1754E−02 | −2.5149E−02 | 7.3299E−03 | −1.4819E−03 |
| | Cone coefficient | Aspherical coefficient | | | | |
| | k | A14 | A16 | A18 | A20 | |
| R1 | −1.2140E+00 | 1.2014E+02 | −1.6433E+02 | 1.2487E+02 | −4.0498E+01 | |
| R2 | 9.4058E+01 | 3.2076E+02 | −5.2896E+02 | 4.8425E+02 | −1.8969E+02 | |
| R3 | −1.7054E+04 | −6.0834E+01 | 7.7341E+01 | −5.7127E+01 | 1.8600E+01 | |
| R4 | −3.7054E+00 | 3.6199E+01 | −3.9786E+01 | 2.4451E+01 | −6.4111E+00 | |

TABLE 10-continued

| | | | | | |
|---|---|---|---|---|---|
| R5 | 1.6150E+02 | −1.5631E+01 | 1.6022E+01 | −9.3233E+00 | 2.3770E+00 |
| R6 | 4.8139E+02 | −1.7689E+00 | 1.3823E+00 | −6.0515E−01 | 1.1383E−01 |
| R7 | 2.3756E+02 | −1.3352E−02 | 8.0428E−03 | −1.9419E−03 | 1.6890E−04 |
| R8 | −4.6297E+00 | 1.7007E−02 | −3.7252E−03 | 4.6567E−04 | −2.5340E−05 |
| R9 | −1.7333E+02 | −9.3738E−04 | 7.6944E−05 | −3.4979E−06 | 6.7485E−08 |
| R10 | −4.5261E+00 | 1.9681E−04 | −1.6074E−05 | 7.2931E−07 | −1.4160E−08 |

Table 11 and Table 12 show the design data of the inflection point and the stagnation point of each lens in the camera optical lens 30.

TABLE 11

| | Number of inflection points | Inflection point position 1 | Inflection point position 2 | Inflection point position 3 |
|---|---|---|---|---|
| P1R1 | 0 | / | / | / |
| P1R2 | 1 | 0.445 | / | / |
| P2R1 | 1 | 0.265 | / | / |
| P2R2 | 0 | / | / | / |
| P3R1 | 2 | 0.215 | 0.945 | / |
| P3R2 | 2 | 0.135 | 1.155 | / |
| P4R1 | 1 | 1.485 | / | / |
| P4R2 | 1 | 1.105 | / | / |
| P5R1 | 3 | 0.265 | 1.315 | 2.705 |
| P5R2 | 3 | 0.545 | 2.485 | 2.865 |

TABLE 12

| | Number of stagnation points | Stagnation point position 1 | Stagnation point position 2 |
|---|---|---|---|
| P1R1 | 0 | / | / |
| P1R2 | 1 | 0.645 | / |
| P2R1 | 1 | 0.455 | / |
| P2R2 | 0 | / | / |
| P3R1 | 1 | 0.375 | / |
| P3R2 | 1 | 0.235 | / |
| P4R1 | 0 | / | / |
| P4R2 | 1 | 1.895 | / |
| P5R1 | 2 | 0.485 | 2.065 |
| P5R2 | 1 | 1.535 | / |

In addition, the values corresponding to the various parameters and the parameters specified in the conditions in Embodiment 3 are listed in Table 17. It can be seen that the camera optical lens according to this embodiment satisfies the above-mentioned conditions.

Figure 10:
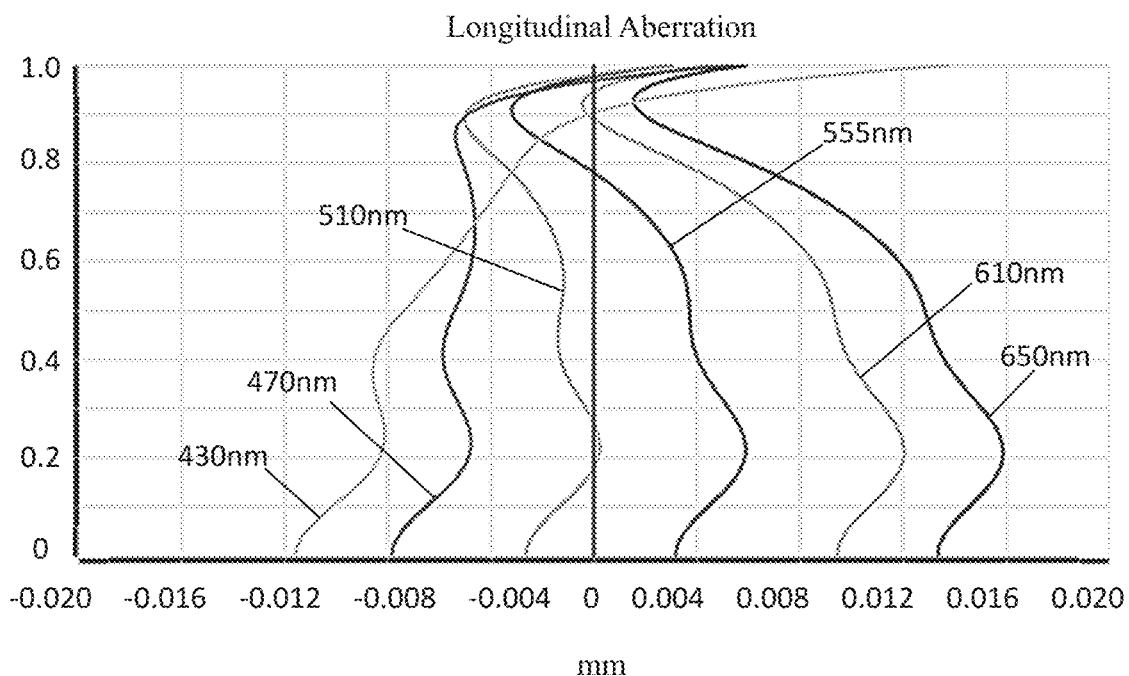
FIG. 10 is a schematic diagram of longitudinal aberration of the camera optical lens shown in FIG. 9.
Figure 11:
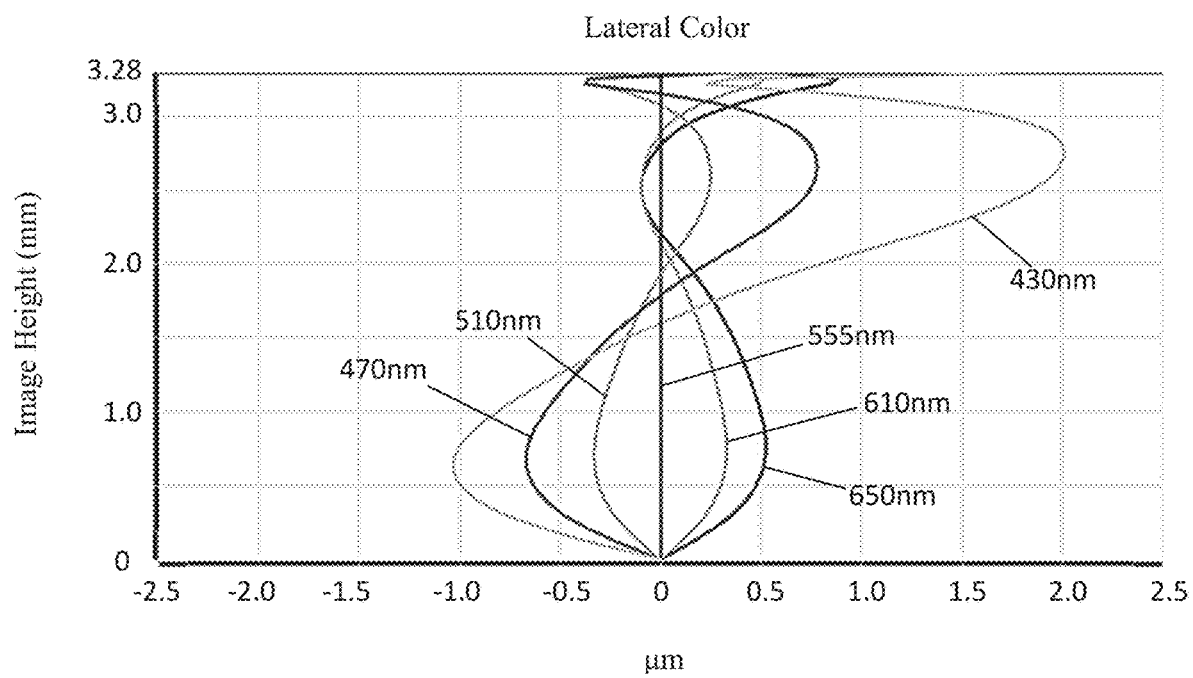
FIG. 11 is a schematic diagram of lateral color of the camera optical lens shown in FIG. 9.
Figure 12:
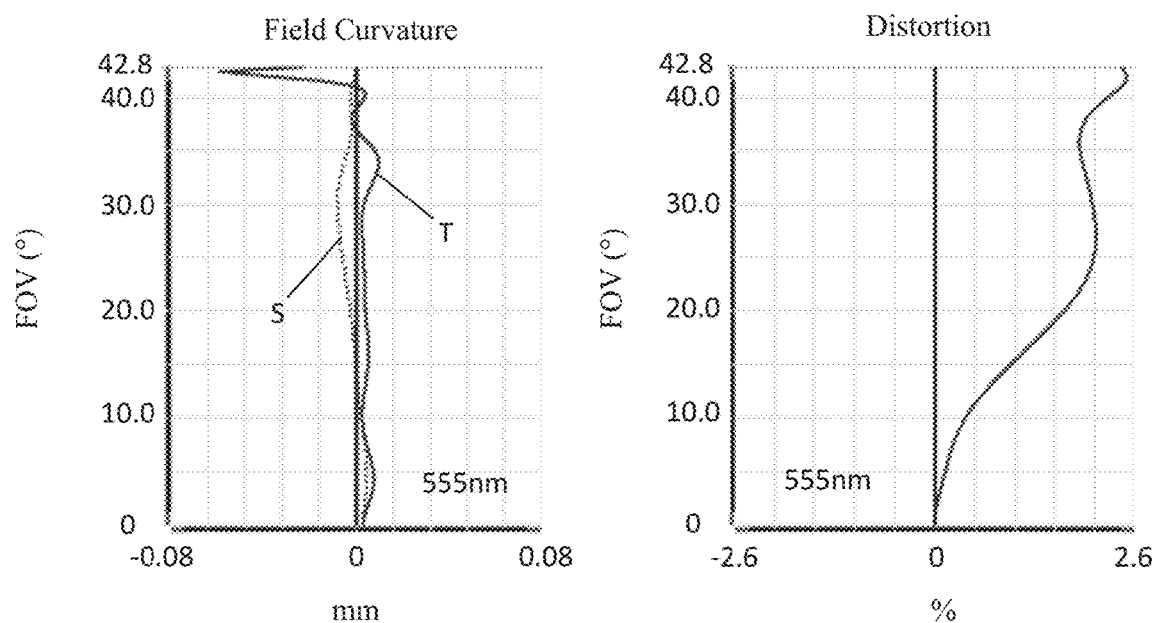
FIG. 12 is a schematic diagram of field curvature and distortion of the camera optical lens shown in FIG. 9.

FIG. 10 and FIG. 11 respectively show schematic diagrams of longitudinal aberration and lateral color of light having wavelengths of 650 nm, 610 nm, 555 nm, 510 nm, 470 nm, and 430 mm after passing through the camera optical lens 30. FIG. 12 shows a schematic diagram of field curvature and distortion of light having a wavelength of 555 nm after passing through the camera optical lens 30. In FIG. 12, the field curvature S is the field curvature in a sagittal direction, and the field curvature T is the field curvature in a meridian direction.

In this embodiment, an entrance pupil diameter ENPD of the camera optical lens 30 is 1.428 mm, the full field of view image height IH is 3.282 mm, and the FOV in a diagonal direction is 85.60°, so that the camera optical lens 30 can meet the design requirements of a large aperture, a wide angle and ultra-thinness. The on-axis and off-axis color aberrations are fully corrected, and the camera optical lens 30 has excellent optical performance.

Embodiment 4

Figure 13:
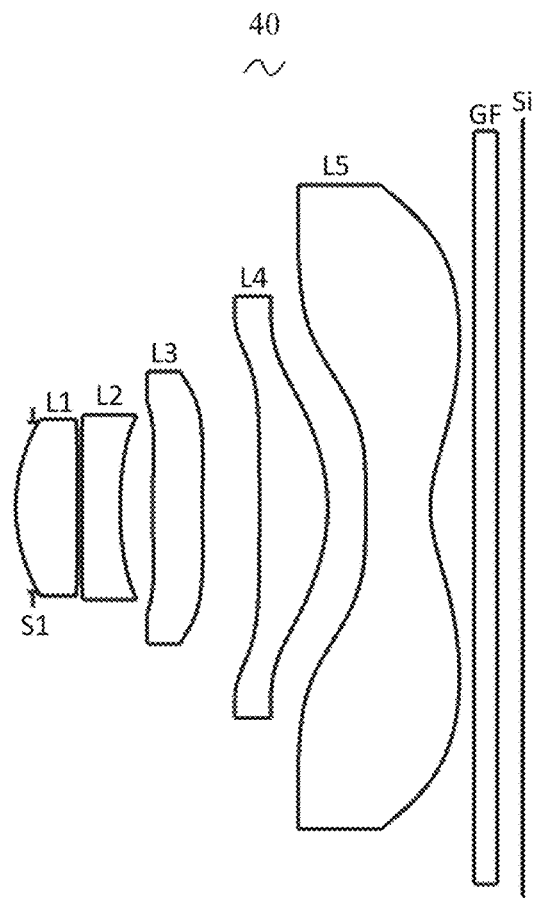
FIG. 13 is a schematic structural diagram of a camera optical lens according to Embodiment 4.

FIG. 13 is a schematic structural diagram of a camera optical lens 40 according to Embodiment 4. Embodiment 4 is basically the same as Embodiment 1, and the symbols listed in the following tables have the same representation as Embodiment 1, therefore, the same part will not be repeated herein, and only the difference from Embodiment 1 will be described in the following.

Table 13 and Table 14 show the design data of the camera optical lens 40 according to Embodiment 4 of the present invention.

TABLE 13

| | R | d | | nd | | vd |
|---|---|---|---|---|---|---|
| S1 | ∞ | d0 = | −0.149 | | | |
| R1 | 1.512 | d1 = | 0.550 | nd1 | 1.5444 | v1 55.82 |
| R2 | 268.376 | d2 = | 0.037 | | | |
| R3 | 192.733 | d3 = | 0.343 | nd2 | 1.6610 | v2 20.53 |
| R4 | 2.977 | d4 = | 0.289 | | | |
| R5 | 7.386 | d5 = | 0.446 | nd3 | 1.5444 | v3 55.82 |
| R6 | 22.156 | d6 = | 0.510 | | | |
| R7 | −23.275 | d7 = | 0.602 | nd4 | 1.5346 | v4 55.69 |
| R8 | −1.632 | d8 = | 0.337 | | | |
| R9 | 16.004 | d9 = | 0.580 | nd5 | 1.5346 | v5 55.69 |
| R10 | 1.067 | d10 = | 0.389 | | | |
| R11 | ∞ | d11 = | 0.210 | ndg | 1.5168 | vg 64.17 |
| R12 | ∞ | d12 = | 0.224 | | | |

Table 14 shows the aspherical surface data of the respective lenses in the camera optical lens 40 according to Embodiment 4 of the present invention

TABLE 14

| | Cone coefficient | Aspherical coefficient | | | | |
|---|---|---|---|---|---|---|
| | k | A4 | A6 | A8 | A10 | A12 |
| R1 | −1.3057E+00 | 3.5990E−02 | 1.6297E−01 | −1.6230E+00 | 9.7805E+00 | −3.7127E+01 |
| R2 | 1.1206E+03 | −9.0327E−02 | 3.4541E−01 | −1.2072E+00 | 4.0053E+00 | −9.6903E+00 |
| R3 | 2.0003E+03 | −6.6092E−02 | 3.4134E−01 | −7.0790E−01 | 1.6202E+00 | −4.0679E+00 |
| R4 | −1.7433E−01 | −5.9684E−03 | 3.2890E−01 | −1.4109E+00 | 5.7881E+00 | −1.6376E+01 |
| R5 | −1.3521E+01 | −1.0169E−01 | −1.7203E−01 | 1.4022E+00 | −7.2919E+00 | 2.3232E+01 |
| R6 | 2.4698E+02 | −5.6800E−02 | −9.7336E−02 | 1.1638E−01 | −6.4827E−02 | −1.2536E−01 |
| R7 | 1.8322E+02 | 5.2353E−02 | −9.3951E−02 | 5.1577E−02 | −2.7823E−02 | 3.8070E−02 |

TABLE 14-continued

| | | | | | | |
|---|---|---|---|---|---|---|
| R8 | −5.1409E+00 | −5.6973E−02 | 7.9734E−03 | 1.7180E−02 | −4.1463E−02 | 5.2723E−02 |
| R9 | −8.5016E+02 | −3.7137E−01 | 2.7048E−01 | −1.6265E−01 | 9.2131E−02 | −3.7020E−02 |
| R10 | −5.3172E+00 | −1.4512E−01 | 9.7487E−02 | −4.6436E−02 | 1.5193E−02 | −3.3441E−03 |

| | Cone coefficient | Aspherical coefficient | | | |
|---|---|---|---|---|---|
| | k | A14 | A16 | A18 | A20 |
| R1 | −1.3057E+00 | 8.8399E+01 | −1.2852E+02 | 1.0426E+02 | −3.6242E+01 |
| R2 | 1.1206E+03 | 1.0511E+01 | 1.1176E+00 | −1.1149E+01 | 6.0534E+00 |
| R3 | 2.0003E+03 | 5.7628E+00 | −3.2514E+00 | 2.6686E−02 | 2.0583E−01 |
| R4 | −1.7433E−01 | 3.0402E+01 | −3.5410E+01 | 2.3716E+01 | −6.9771E+00 |
| R5 | −1.3521E+01 | −4.5748E+01 | 5.3781E+01 | −3.4642E+01 | 9.4407E+00 |
| R6 | 2.4698E+02 | 2.8287E−01 | −2.5538E−01 | 1.1134E−01 | −1.7757E−02 |
| R7 | 1.8322E+02 | −4.0417E−02 | 2.1154E−02 | −5.1971E−03 | 4.8589E−04 |
| R8 | −5.1409E+00 | −3.0720E−02 | 9.0107E−03 | −1.3122E−03 | 7.5765E−05 |
| R9 | −8.5016E+02 | 9.3433E−03 | −1.4137E−03 | 1.1769E−04 | −4.1547E−06 |
| R10 | −5.3172E+00 | 4.7840E−04 | −4.2277E−05 | 2.0807E−06 | −4.3215E−08 |

Table 15 and Table 16 show the design data of the inflection point and the stagnation point of each lens in the camera optical lens 40.

TABLE 15

| | Number of inflection points | Inflection point position 1 | Inflection point position 2 | Inflection point position 3 |
|---|---|---|---|---|
| P1R1 | 0 | / | / | / |
| P1R2 | 1 | 0.065 | / | / |
| P2R1 | 3 | 0.085 | 0.325 | 0.735 |
| P2R2 | 0 | / | / | / |
| P3R1 | 2 | 0.315 | 0.905 | / |
| P3R2 | 2 | 0.245 | 1.125 | / |
| P4R1 | 2 | 1.415 | 1.685 | / |
| P4R2 | 1 | 1.075 | / | / |
| P5R1 | 3 | 0.125 | 1.195 | 2.305 |
| P5R2 | 2 | 0.535 | 2.785 | / |

TABLE 16

| | Number of stagnation points | Stagnation point position 1 | Stagnation point position 2 |
|---|---|---|---|
| P1R1 | 0 | / | / |
| P1R2 | 1 | 0.105 | / |
| P2R1 | 2 | 0.155 | 0.415 |
| P2R2 | 0 | / | / |
| P3R1 | 1 | 0.525 | / |
| P3R2 | 1 | 0.395 | / |
| P4R1 | 0 | / | / |
| P4R2 | 1 | 1.755 | / |
| P5R1 | 1 | 0.205 | / |
| P5R2 | 1 | 1.505 | / |

In addition, the values corresponding to the various parameters and the parameters specified in the conditions in Embodiment 4 are listed in the following Table 17. It can be seen that the camera optical lens according to this embodiment satisfies the above-mentioned condition.

Figure 14:
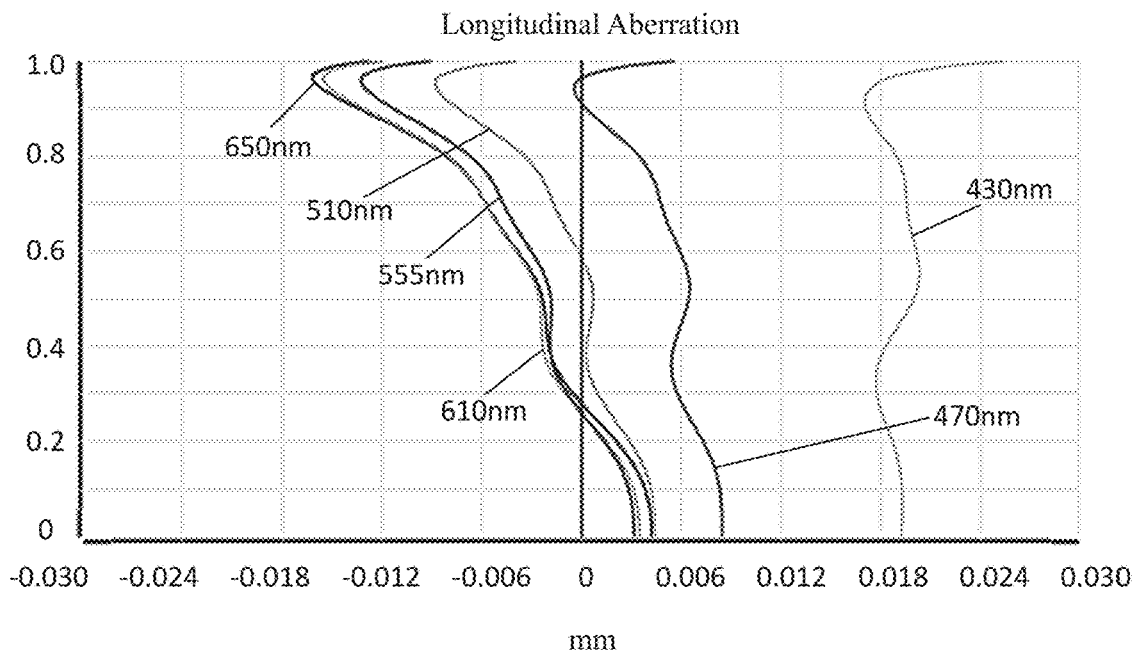
FIG. 14 is a schematic diagram of longitudinal aberration of the camera optical lens shown in FIG. 13.
Figure 15:
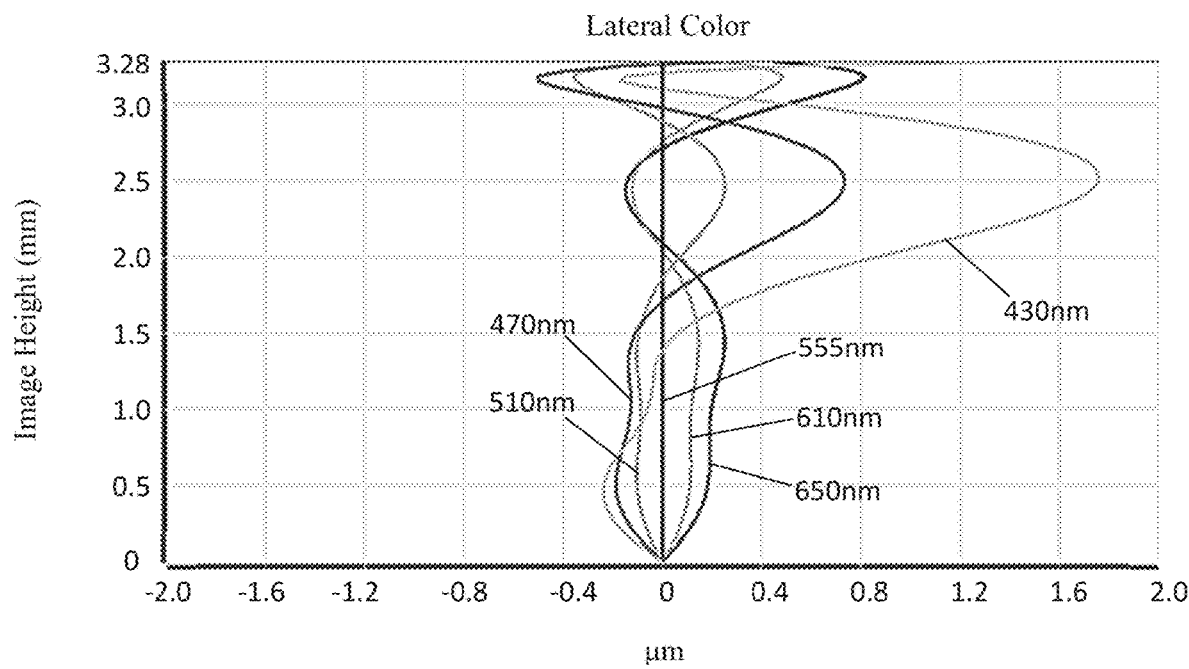
FIG. 15 is a schematic diagram of lateral color of the camera optical lens shown in FIG. 13.
Figure 16:
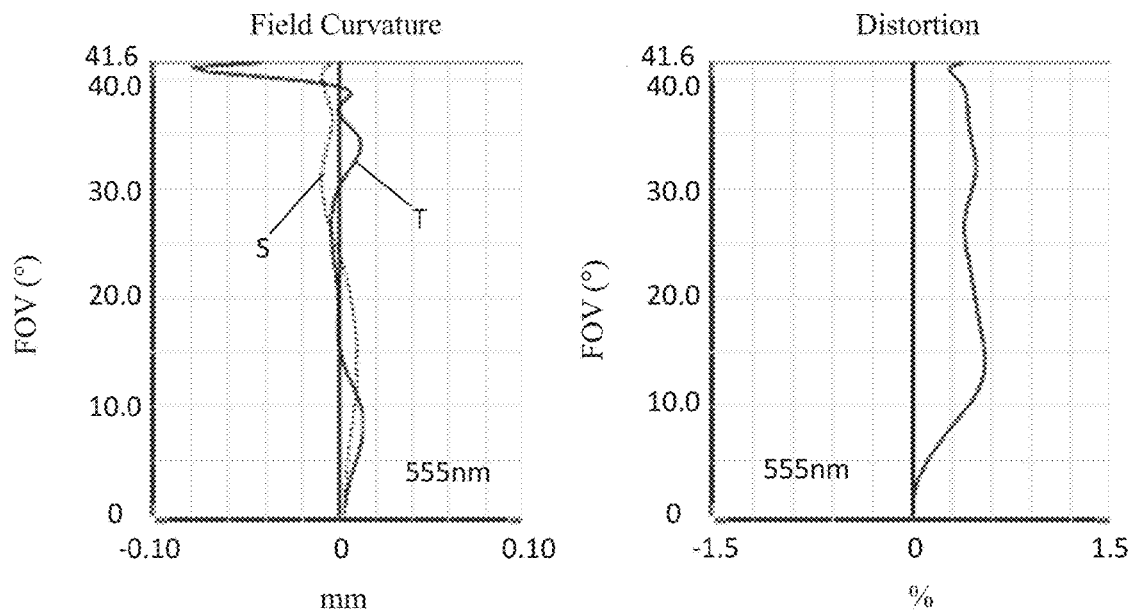
FIG. 16 is a schematic diagram of field curvature and distortion of the camera optical lens shown in FIG. 13.

FIG. 14 and FIG. 15 respectively show schematic diagrams of longitudinal aberration and lateral color of light having wavelengths of 650 nm, 610 nm, 555 nm, 510 nm, 470 nm, and 430 mm after passing through the camera optical lens 40. FIG. 16 shows a schematic diagram of field curvature and distortion of light having a wavelength of 555 nm after passing through the camera optical lens 40. In FIG. 16, the field curvature S is the field curvature in a sagittal direction, and the field curvature T is the field curvature in a meridian direction.

In this embodiment, an entrance pupil diameter ENPD of the camera optical lens 40 is 1.512 mm, the full field of view image height IH is 3.282 mm, and the FOV in a diagonal direction is 83.20°, so that the camera optical lens 40 can meet the design requirements of a large aperture, a wide angle and ultra-thinness. The on-axis and off-axis color aberrations are fully corrected, and the camera optical lens 40 has excellent optical performance.

TABLE 17

| Parameters and conditions | Embodiment 1 | Embodiment 2 | Embodiment 3 | Embodiment 4 |
|---|---|---|---|---|
| f2/f | −1.63 | −1.73 | −2.00 | −1.25 |
| f4/f5 | −1.11 | −0.80 | −1.13 | −1.50 |
| d6/d8 | 2.12 | 1.50 | 2.99 | 1.51 |
| (R1 + R2)/(R1 − R2) | −1.05 | −1.00 | −1.50 | −1.01 |
| R9/R10 | 11.12 | 6.01 | 6.00 | 15.00 |
| f | 3.245 | 3.224 | 3.427 | 3.628 |
| f1 | 3.054 | 3.473 | 3.420 | 2.783 |
| f2 | −5.292 | −5.568 | −6.852 | −4.538 |
| f3 | 39.907 | 61.888 | 35.626 | 20.070 |
| f4 | 1.891 | 2.484 | 1.934 | 3.241 |
| f5 | −1.710 | −3.100 | −1.717 | −2.162 |
| f12 | 5.805 | 7.169 | 5.668 | 5.352 |
| FNO | 2.40 | 2.40 | 2.40 | 2.40 |
| TTL | 4.296 | 4.477 | 4.480 | 4.517 |
| FOV | 89.80° | 89.40° | 85.60° | 83.20° |
| IH | 3.282 | 3.282 | 3.282 | 3.282 |

It should be understood by those skilled in the art that the above embodiments are merely some specific embodiments of the present invention, and various changes in form and details may be made without departing from the scope of the present invention.

What is claimed is:
1. A camera optical lens, comprising, from an object side to an image side:
   a first lens having a positive refractive power;
   a second lens having a negative refractive power;
   a third lens having a positive refractive power;
   a fourth lens having a positive refractive power; and
   a fifth lens having a negative refractive power,
   wherein the camera optical lens satisfies following conditions:

$$-2.00 \leq f2/f \leq -1.25;$$

$$-1.50 \leq f4/f5 \leq -0.80;$$

$$1.50 \leq d6/d8 \leq 3.00;$$

$-1.50 \leq (R1+R2)/(R1-R2) \leq -1.00$; and $6.00 \leq R9/R10 \leq 15.00$, where f denotes a focal length of the camera optical lens, f2 denotes a focal length of the second lens, f4 denotes a focal length of the fourth lens, f5 denotes a focal length of the fifth lens, d6 denotes an on-axis distance from an image side surface of the third lens to an object side surface of the fourth lens, d8 denotes an on-axis distance from an image side surface of the fourth lens to an object side surface of the fifth lens, R1 denotes a central curvature radius of an object side surface of the first lens, R2 denotes a central curvature radius of an image side surface of the first lens, R9 denotes a central curvature radius of the object side surface of the fifth lens, and R10 denotes a central curvature radius of an image side surface of the fifth lens.

2. The camera optical lens as described in claim 1, further satisfying a following condition:

$-10.00 \leq (R5+R6)/(R5-R6) \leq -2.00$, where R5 denotes a central curvature radius of an object side surface of the third lens, and R6 denotes a central curvature radius of the image side surface of the third lens.

3. The camera optical lens as described in claim 1, further satisfying following conditions:

$0.38 \leq f1/f \leq 1.62$; and $0.05 \leq d1/TTL \leq 0.18$, where f1 denotes a focal length of the first lens, d1 denotes an on-axis thickness of the first lens, and TTL denotes a total optical length from the object side surface of the first lens to an image plane of the camera optical lens along an optic axis.

4. The camera optical lens as described in claim 1, further satisfying following conditions:

$0.52 \leq (R3+R4)/(R3-R4) \leq 2.27$; and $0.02 \leq d3/TTL \leq 0.11$, where R3 denotes a central curvature radius of an object side surface of the second lens, R4 denotes a central curvature radius of an image side surface of the second lens, d3 denotes an on-axis thickness of the second lens, and TTL denotes a total optical length from the object side surface of the first lens to an image plane of the camera optical lens along an optic axis.

5. The camera optical lens as described in claim 1, further satisfying following conditions:

$2.77 \leq f3/f \leq 28.79$; and $0.05 \leq d5/TTL \leq 0.15$, where f3 denotes a focal length of the third lens, d5 denotes an on-axis thickness of the third lens, and TTL denotes a total optical length from the object side surface of the first lens to an image plane of the camera optical lens along an optic axis.

6. The camera optical lens as described in claim 1, further satisfying following conditions:

$0.28 \leq f4/f \leq 1.34$;

$0.53 \leq (R7+R8)/(R7-R8) \leq 1.73$; and $0.05 \leq d7/TTL \leq 0.23$, where R7 denotes a central curvature radius of the object side surface of the fourth lens, R8 denotes a central curvature radius of the image side surface of the fourth lens, d7 denotes an on-axis thickness of the fourth lens, and TTL denotes a total optical length from the object side surface of the first lens to an image plane of the camera optical lens along an optic axis.

7. The camera optical lens as described in claim 1, further satisfying following conditions:

$-1.92 \leq f5/f \leq -0.33$;

$0.57 \leq (R9+R10)/(R9-R10) \leq 2.10$; and $0.04 \leq d9/TTL \leq 0.22$, where d9 denotes an on-axis thickness of the fifth lens, and TTL denotes a total optical length from the object side surface of the first lens to an image plane of the camera optical lens along an optic axis.

8. The camera optical lens as described in claim 1, further satisfying a following condition:

$TTL/IH \leq 1.38$, where TTL denotes a total optical length from the object side surface of the first lens to an image plane of the camera optical lens along an optic axis, and IH denotes an image height of the camera optical lens.

9. The camera optical lens as described in claim 1, further satisfying a following condition:

$FOV \geq 83°$, where FOV denotes a field of view of the camera optical lens.

10. The camera optical lens as described in claim 1, further satisfying a following condition:

$FNO \leq 2.41$, where FNO denotes an F number of the camera optical lens.

* * * * *